United States Patent
Craig et al.

[11] Patent Number: 5,823,470
[45] Date of Patent: Oct. 20, 1998

[54] SPLIT TORQUE PROPROTOR TRANSMISSION

[75] Inventors: Gary A. Craig; Gregory F. Heath; Vijay J. Sheth, all of Mesa, Ariz.

[73] Assignee: McDonnell Douglas Helicopter Co., Mesa, Ariz.

[21] Appl. No.: 682,026

[22] Filed: Jul. 16, 1996

[51] Int. Cl.$^6$ .............. B64C 27/28; B64C 35/00
[52] U.S. Cl. ........... 244/7 R; 244/60; 74/665 GA; 74/665 GB
[58] Field of Search ................. 244/6, 7 R, 56, 244/60; 74/665 GA, 665 GB, 665 GC, 665 H, 416, 417, 420

[56] References Cited

U.S. PATENT DOCUMENTS

| | | | |
|---|---|---|---|
| 2,462,824 | 2/1949 | Zimmerman et al. | 244/60 |
| 3,106,369 | 10/1963 | Borst | 244/7 R |
| 3,136,499 | 6/1964 | Kessler | 244/60 X |
| 3,368,420 | 2/1968 | Alexander, Jr. | 74/420 X |
| 3,567,157 | 3/1971 | Dancik | 244/56 X |
| 4,118,997 | 10/1978 | Woodward et al. | 74/665 GB X |
| 4,518,287 | 5/1985 | Bossler, Jr. . | |
| 4,964,315 | 10/1990 | Willis, Jr. | 74/665 GA |
| 5,054,716 | 10/1991 | Wilson | 244/60 X |
| 5,135,442 | 8/1992 | Bossler, Jr. . | |
| 5,178,028 | 1/1993 | Bossler, Jr. . | |
| 5,213,010 | 5/1993 | Hayafusa et al. | 74/665 GA |
| 5,233,886 | 8/1993 | Bossler, Jr. . | |
| 5,709,357 | 1/1998 | Von Wilmowsky | 244/7 R |

FOREIGN PATENT DOCUMENTS

| | | | |
|---|---|---|---|
| 848743 | 7/1939 | France | 244/60 |

*Primary Examiner*—William Grant
*Attorney, Agent, or Firm*—Donald E. Stout; Kenton R. Mullins

[57] ABSTRACT

A conversion access gearset includes a first bevel gear, which is connected to a wing cross shaft leading from the proprotor drive train path to the second turbine engine. A second bevel gear is connected to a main transmission input shaft, which is adapted for driving the proprotor. A bevel pinion receives power from the turbine engine, and drives both the first bevel gear and the second bevel gear. An input pinion is connected between the turbine engine and the bevel pinion, and several idler gears are connected between the input pinion and the bevel pinion. A helical gear is connected between the several idler gears and the bevel pinion. The main transmission input shaft is connected to a main transmission input pinion, which is located on the main transmission input shaft opposite of the second bevel gear. The main transmission input pinion receives torque from the main transmission input shaft, and a torque-splitting device splits the torque received from the main transmission input pinion. A torque recombining system recombines the split torque from the upper face gear and the lower face gear, before routing of the recombined torque to the proprotor.

19 Claims, 2 Drawing Sheets

SPLIT TORQUE PROPROTOR TRANSMISSION

BACKGROUND OF THE INVENTION

1. Field of the Invention

The present invention relates generally to tiltrotor aircraft and, more particularly, to a split torque proprotor transmission for use on a tiltrotor aircraft.

2. Description of Related Art

FIG. 1 illustrates a conventional tiltrotor aircraft 10 having a fuselage 12 and two wings 14, 16 attached to an upper portion of the fuselage 12. The left wing 14 comprises a left nacelle 15 which is rotatable between two configurations. The left nacelle 15 has a left proprotor 23 attached thereto. When the left nacelle 15 is in the airplane mode, a plane formed by rotation of the left proprotor 23 is generally perpendicular to a plane of the left wing 14. When the left nacelle 15 is orientated in the helicopter mode, the plane formed by rotation of the left proprotor 23 is generally parallel to a plane of the left wing 14. The left nacelle 15 is shown in phantom in the helicopter mode and denoted by the reference number 27. Similarly, a right wing 16 is attached to the fuselage 12, and a right nacelle 17 having a right proprotor 25 is rotatable between an airplane configuration and a helicopter configuration. When the right nacelle 17 is in the airplane configuration, a plane formed by rotation of the right proprotor 25 is generally perpendicular to a plane of the right wing 16. When the right nacelle 17 is orientated in the helicopter mode, as shown in phantom and denoted by the reference number 30, a plane formed by rotation of the right proprotor 25 is generally parallel to a plane of the right wing 16.

Both the left nacelle 15 and the right nacelle 17 comprise a turbine engine and gearing for routing torque from the turbine engine to each of the two proprotors. The conventional drive systems for routing the torque from these two turbine engines to the two proprotors generally comprise a significant percentage of the total weight of the tiltrotor aircraft 10. Each drive system connecting the turbine engine within a given nacelle to the proprotor attached to that given nacelle, further functions to reduce the driveshaft speed from the turbine engine to the proprotor. The torque from the turbine engine is not only increased, as rotational velocity is decreased, but this torque is also redirected through a series of gear reduction stages and additional driveshafts connecting the turbine engine to the proprotor.

The drive system of each conventional nacelle generally comprises a first proprotor gearbox and a second tilt access gearbox. These two gearboxes are generally located in separate housings within the nacelle and, further, are located within the nacelle separate from the turbine engine. Both the proprotor gearbox and the tilt access gearbox must be able to rotate with the nacelle as the nacelle tilts between the airplane or fixed wing mode orientation and the helicopter mode orientation. The tilt access gearbox within each nacelle connects to a cross shaft within the wing of the nacelle, and travels across the two wings to the other nacelle to thereby connect to the tilt access gearbox in the other nacelle.

The two tilt access gearboxes of the two nacelles, and the cross shafts connecting the two tilt access gearboxes, provide contingency power across the wings of the tiltrotor aircraft 10 in the case of a one-engine-out condition. For example, if the turbine engine within the left nacelle 15 ceased to function properly, power from the turbine engine in the right nacelle 17 would be routed from the tilt access gearbox within the right nacelle 17, through the cross shafts of the right wing 16 and the left wing 14, and into the tilt access gearbox within the left nacelle 15. This power would then be routed from the tilt access gearbox within the left nacelle 15 into the proprotor gearbox of the left nacelle 15, to thereby drive the left proprotor 23. Thus, when the turbine engine in the left nacelle 15 flames out, the turbine engine in the right nacelle 17 powers both the right proprotor 25 and the left proprotor 23.

Since a function of the drive system within each nacelle is to reduce rotational velocity and increase torque, while routing power from the engine to the proprotor, transmission weight within the nacelle increases with distance away from the turbine engine and toward the proprotor. Heavier gears are needed for the greater torque. The weight of the gears carrying high engine speed and low torque near the turbine engine is relatively light, and the weight of the gears carrying high torque and low rotational velocity near the proprotor is relatively high. The weight of the gears near the proprotors required to carry this heavy torque thus comprises a significant portion of the total weight of the tiltrotor aircraft 10.

A conventional proprotor gearbox may include, for example, a large external gear carrying the full power from the engine to the proprotor. The large external gear reduces the rotational velocity and increases the torque. A subsequent stage of the typical, conventional proprotor gearbox includes a planetary gear stage, which uses up to 8 gears at its output stage. This typical design of the proprotor gearbox within the nacelle includes a large number of moving parts, and is thus more subject to break down than a proprotor gearset having fewer moving parts. Additionally, this typical proprotor gearbox tends to have a relatively high weight to horsepower ratio, which is undesirable. Other shortcomings of a prior art nacelle stem from the separate proprotor gearbox and tilt access gearbox within a nacelle of a tiltrotor aircraft. As mentioned previously, a typical nacelle includes a turbine engine, a proprotor gearbox, and a tilt access gearbox, with the proprotor gearbox having its own separate housing within the nacelle and with the tilt access gearbox having its own separate housing within the nacelle. The separate gearboxes add to the overall weight. A first drive train typically connects the proprotor gearbox to the turbine engine, and a second drive train typically connects the proprotor gearbox to the tilt access gearbox. A substantial total number of gears is typically required to span both the distance of the first drive train between the proprotor gearbox and the turbine engine and the distance of the second drive train between the proprotor gearbox and the tilt access gearbox. These two separate drive trains are often required in the prior art, as a result of the difference in the input angles of the driveshaft involved. These extra gears, bearings, and housings increase the weight of the overall nacelle. Additionally, the large number of parts comprising such a prior art nacelle reduces the reliability thereof.

A need has existed in the prior art for a simple and light system capable of, among other things, carrying the required high torque and low rotational velocity power through the later stages of the drive system of a nacelle without adding substantially to the total weight of the tiltrotor aircraft.

SUMMARY OF THE INVENTION

The split torque proprotor transmission of the present invention is both relatively lightweight and reliable. The large gears of the prior art needed for carrying low rotational velocity and high torque, near the proprotor output, are not required by the split torque proprotor transmission of the present invention. The high torque carried by prior art gears near the proprotor of a nacelle is split by the present invention. The splitting of this torque near the output stage of the gearing allows for significant downsizing of gear size and weight. Since the load and torque carrying capacity of the gears of the present invention near the output to the proprotor are reduced, the size and weight of these gears is also reduced.

Although the split torque gearing of the present invention reduces weight, another significant advantage of this division of the torque at the output stage is a reduction in volume required by the gears. The split torque proprotor transmission of the present invention allows for elimination of the planetary output gear stage of the prior art. More particularly, the eight gear planetary arrangement of the prior art, which includes a sun gear, ring gear, and six planet gears, is replaced by a three gear output stage. This three gear output stage of the present invention includes two helical pinions and an internal helical ring gear. The gearing arrangement of the present invention does not recombine the torque until just before the output to the proprotor, thus generating a large reduction in weight and volume.

Instead of requiring a separately housed proprotor gearbox and a separately housed tilt access gearbox, and separate drive trains, in each nacelle, the present invention incorporates a single housing and a shared drive train within that housing. The combining of these prior art proprotor gearboxes and tilt access gearboxes into a single housing reduces the weight of the nacelle and increases the reliability thereof. In contrast to the first prior art drive train between the proprotor gearbox and the turbine engine and the second prior art drive train between the proprotor gearbox and the tilt access gearbox, a single drive train in shared by the proprotor gearset and the conversion action gearset of the present invention. More particularly, the drive path from the turbine engine and the drive path from the wing cross shaft are combined at the conversion access gearset, to thereby yield a single input drive path to the proprotor gearset of the present invention. The separate tilt access gearbox of the prior art is thus eliminated, since the conversion access gearset of the present invention is integral with the proprotor transmission of the present invention.

Although differences in the input angles of a typical prior art driveshaft often required two separate drive train pathways from the proprotor gearbox to both the turbine engine and the tilt access gearbox, the angle of the single, shared input shaft of the present invention does not. This single drive shaft, which is shared by both the turbine engine and the conversion access gearset, and which leads to the proprotor gearset, is directly compatible with both the face gear arrangement of the proprotor gearset and the input angle of the turbine engine of the present invention. These angles provide for significant reduction in weight and improvements in reliability, since fewer components are required to implement the drive train of the present invention.

The proprotor drive train path of the present invention, which is adapted for the routing power from a turbine engine to a proprotor of a tiltrotor aircraft, includes a proprotor gearset adapted for receiving power from the turbine engine and for driving the proprotor. A conversion access gearset is operatively connected to the proprotor gearset, and provides for the optional routing of power from the turbine engine to a second proprotor in the event of failure of a second turbine engine. Both the proprotor gearset and the conversion access gearset are protected by a single housing.

The conversion access gearset includes a first bevel gear, which is connected to a wing cross shaft leading from the proprotor drive train path to the second turbine engine. A second bevel gear is connected to a main transmission input shaft, which is adapted for driving the proprotor. A bevel pinion receives power from the turbine engine, and drives both the first bevel gear and the second bevel gear. An input pinion is connected between the turbine engine and the bevel pinion, and several idler gears are connected between the input pinion and the bevel pinion. A helical gear is connected between the several idler gears and the bevel pinion.

The main transmission input shaft is connected to a main transmission input pinion, which is located on the main transmission input shaft opposite of the second bevel gear. The main transmission input pinion receives torque from the main transmission input shaft, and a torque-splitting device splits the torque received from the main transmission input pinion. The torque-splitting device of the present invention includes an upper face gear and a lower face gear. Both the upper face gear and the lower face gear are operatively connected to the main transmission input pinion to thereby split the torque from the main transmission input pinion therebetween. A torque recombining system recombines the split torque from the upper face gear and the lower face gear. The torque recombining system includes a first helical pinion connected to the upper face gear and a second helical pinion connected to the lower face gear. An internal helical ring gear is operatively connected to both the first helical pinion and the second helical pinion to receive torque therefrom and recombine the split torque, before routing of the recombined torque to the proprotor.

The present invention, together with additional features and advantages thereof, may best be understood by reference to the following description taken in connection with the accompanying illustrative drawings.

DETAILED DESCRIPTION OF THE PRESENTLY PREFERRED EMBODIMENTS

Figure 2:
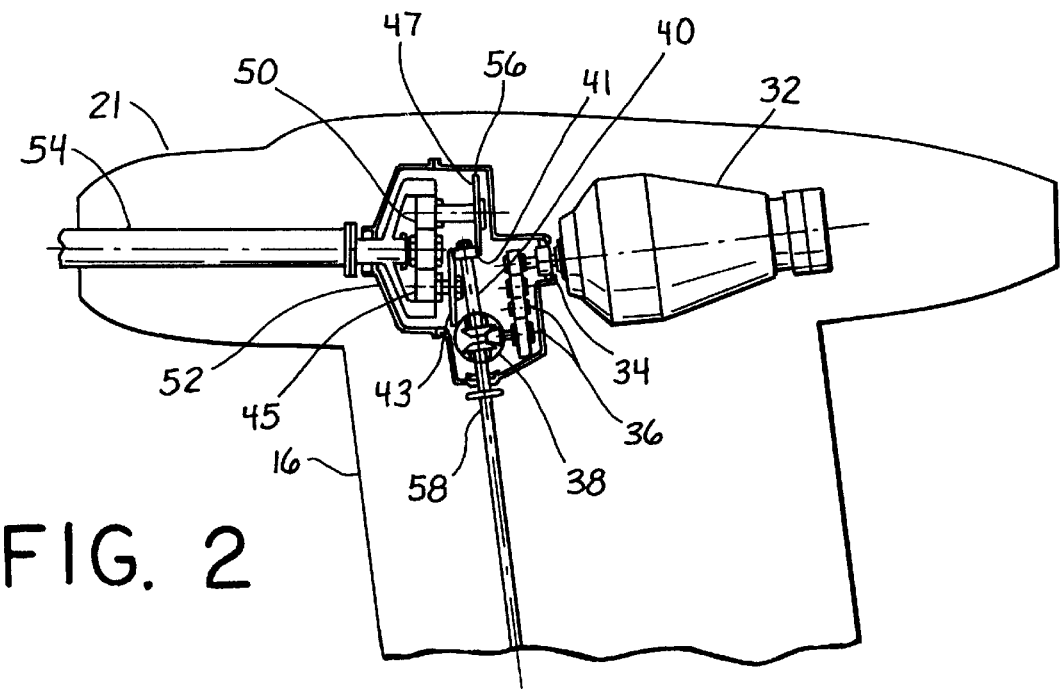
FIG. 2 illustrates a nacelle housing, a turbine engine, and the split torque proprotor transmission of the present invention.

The split torque proprotor transmission of the presently preferred embodiment is illustrated in FIG. 2, connected within a right nacelle 21 of a conventional tiltrotor aircraft 10. Within the right nacelle 21, a turbine engine 32 drives through a one-way overrunning sprag clutch 34 into the split torque proprotor transmission. The split torque proprotor transmission is contained within a single proprotor transmission housing 56. The speed of the input drive shaft from the turbine engine 32 is reduced first through an engine input gearset 36. The engine input gearset 36 feeds torque to a conversion axis gearset 38, which outputs torque to both a wing cross shaft 58 and a main transmission input shaft 40. A main transmission input pinion 41 is connected to the main transmission input shaft 40, and this main transmission input pinion 41 drives an upper face gear 43, which is connected to a first helical pinion 45. The main transmission input pinion 41 also drives a lower face gear 47, which is connected to a second helical pinion 50. The first helical pinion 45 and the second helical pinion 50 together drive an internal helical ring gear 52, which in turn drives a proprotor output 54.

The split torque proprotor transmission of the presently preferred embodiment can be retrofitted into existing tilt rotor aircraft 10, without any need for replacing or modifying the wing cross shaft 58, the turbine engine 32, or the proprotor output 54. The proprotor transmission housing 56 provides a dual function, in a single housing, of a conventional proprotor gearbox and a conventional tilt access gearbox.

Figure 3:
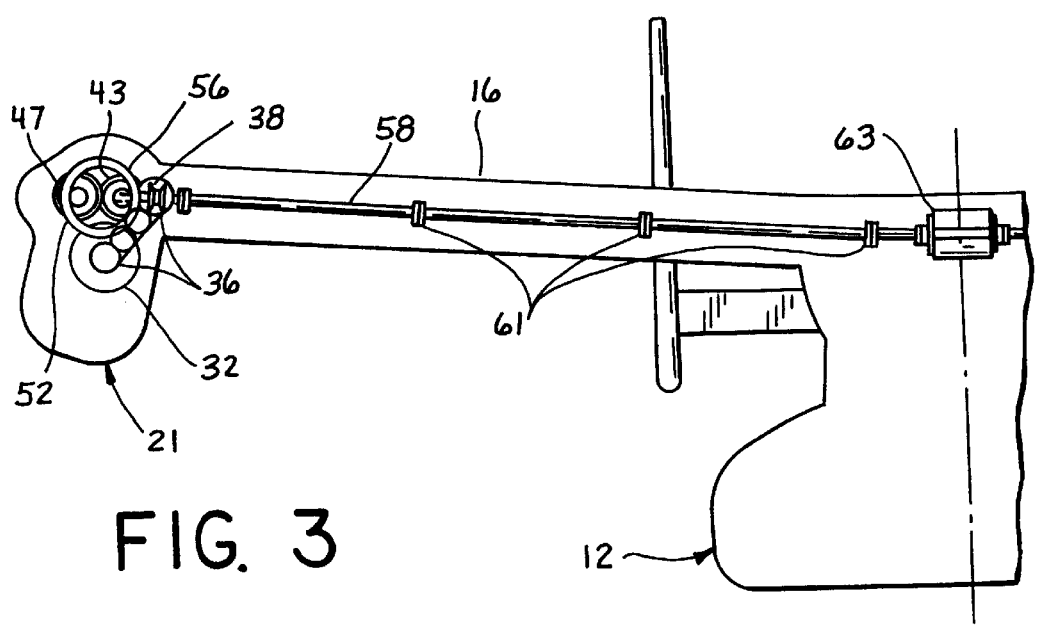
FIG. 3 illustrates a front elevational view of the split torque proprotor transmission of the present invention.

A front elevational view of a split torque proprotor transmission of the presently preferred embodiment, operating within a conventional tilt rotor aircraft 10, is illustrated in FIG. 3. The turbine engine 32 within the right nacelle 21 provides torque to the engine input gearset 36, which comprises four gears, as discussed more fully below with reference to FIG. 4. The conversion access gearset 38, which comprises two bevel gears and a bevel pinion, receives torque from the engine input gearset 36 and routes this torque to both the main transmission input shaft 81 (FIG. 3) and the wing cross shaft 58.

Figure 1:
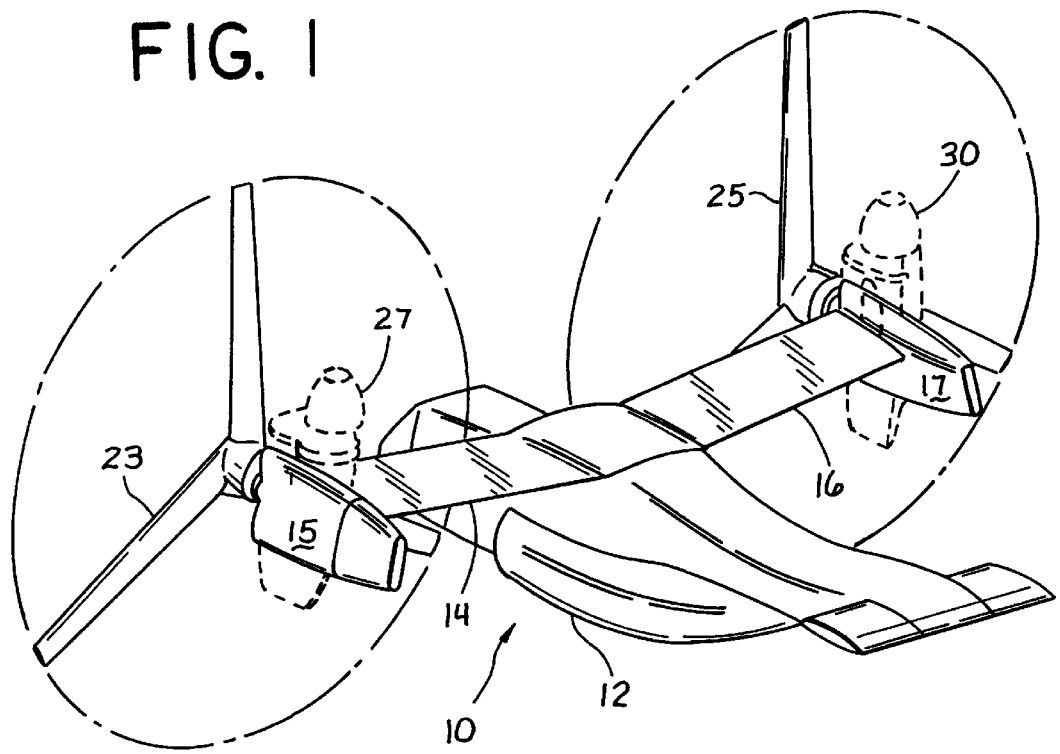
FIG. 1 illustrates a tiltrotor aircraft of the prior art.

Torque is split from the main transmission input shaft 81 between the upper face gear 43 and the lower face gear 47. The torque split by the upper face gear 43 and the lower face gear 47 is recombined by the internal helical ring gear 52, before being output to the right proprotor 25 (FIG. 1). The wing cross shaft 58 comprises several sections joined together by couplings 61. A central accessory gearbox 63 joins the wing cross shaft 58 of the right wing 16 to a similar wing cross shaft (not shown) of the left wing 14. A similar split torque proprotor transmission (not shown) for driving the left proprotor 23 is incorporated into the left nacelle 15 of the tiltrotor aircraft 10.

Figure 4:
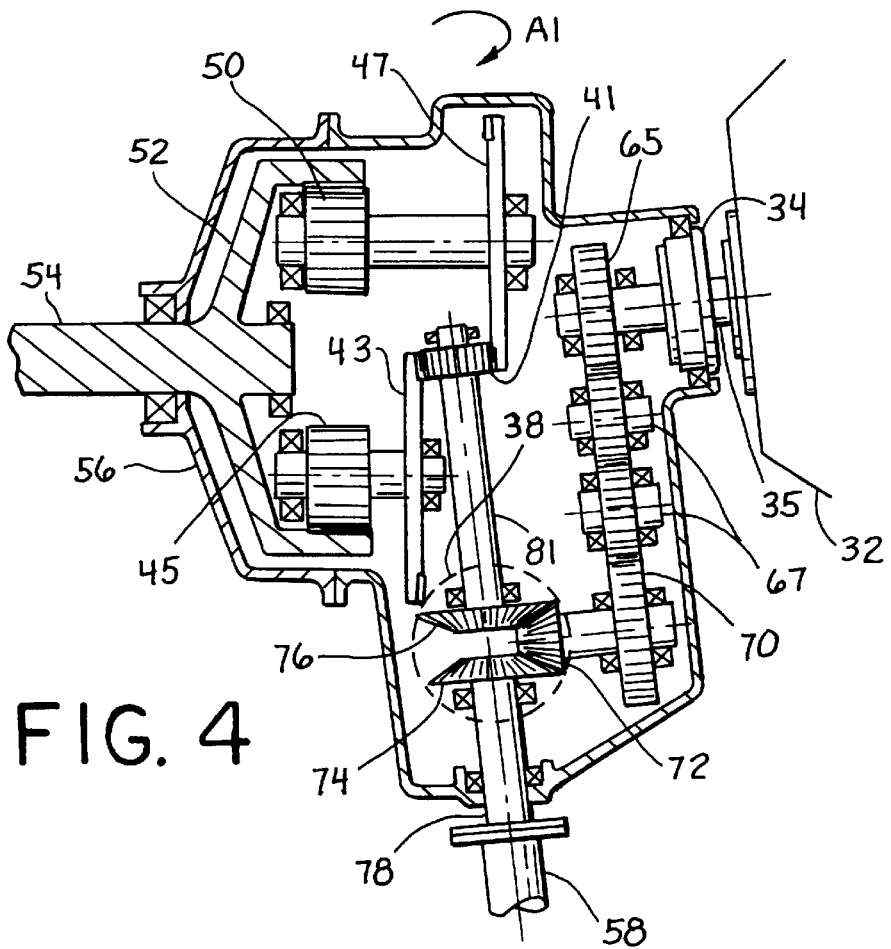
FIG. 4 illustrates a cross-sectional view of the split torque proprotor transmission of the present invention.

Turning to FIG. 4, the split torque proprotor transmission of the presently preferred embodiment, configured within a single proprotor transmission housing 56, accepts torque from a turbine engine 32. The turbine engine 32 drives through the one-way overrunning sprag clutch 34, which in the presently preferred exemplary embodiment may have a rotational velocity of 20,900 revolutions per minute (rpm). The input pinion 65 is driven with the same rotational velocity, but the two idler gears 67 reduce this rotational velocity. The helical gear 70 is driven by the two idler gears 67 at a rotational velocity of 19,042 rpm, according to this example. The two idler gears 67 serve to span the distance between the engine input shaft 35 and the conversion access gearset 38, as the turbine engine 32 is located below and behind the proprotor transmission housing 56.

The bevel pinion 72, which is driven by the helical gear 70 at the same rotational velocity as the helical gear 70, meshes with a first bevel gear 74, and a second bevel gear 76. The bevel pinion 72, the first bevel gear 74 and the second bevel gear 76 together comprise the conversion access gearset 38. In the presently preferred embodiment, the first bevel gear 74 and the second bevel gear 76 are identically sized, and each of these bevel gears 74, 76 performs a second speed reduction. The first bevel gear 74 in this example reduces the bevel pinion rotational velocity of 19,042 rpm to 10,173 rpm, which is the rotational velocity of the wing cross shaft 58. The second bevel gear 76 provides the same rotational velocity reduction to the main transmission input shaft 81.

If the turbine engine 32 and the proprotor transmission housing 56 are located within the right nacelle 17 (FIG. 1) of the tiltrotor aircraft 10, then a second turbine engine (not shown) is located in the left nacelle 15 of the tiltrotor aircraft 10. If the turbine engine within the left nacelle 15 becomes inoperative, then the torque from the bevel pinion 72 drives the left proprotor 23 via the first bevel gear 74 and the wing cross shaft 58. On the other hand, if the turbine engine 32 within the right nacelle 17 becomes inoperative, then the turbine engine within the left nacelle 15 feeds torque to the wing cross shaft 58, which in turn provides torque to the main transmission input shaft 81. Thus, the first bevel gear 74 directs power coming to or from the wing cross shaft (depending on which turbine engine is in a one-engine-inoperative contingency flight condition), while the second bevel gear 76 directs power to the main transmission input shaft 81. When the right nacelle 17, for example, rotates between the horizontal airplane mode configuration and the vertical helicopter mode configuration (shown in fantom in FIG. 1), the conversion access gearset 38 rotates about an axis of the main transmission input shaft 81.

The main transmission input shaft 81, which is connected to the second bevel gear 76, drives a main transmission input pinion 41. The main transmission input pinion 41 drives the upper face gear 43, which is connected to a first helical pinion 45, at a rotational velocity of 2,662 rpm in this example. The main transmission input pinion, which rotates at 10,173 rpm in this example, drives a lower face gear 47 and a second helical pinion 50 at the same rotational velocity of the upper face gear 43 and first helical pinion 45. The torque delivered by the main transmission input pinion 41 is thus split approximately evenly between the upper face gear 43 and the lower face gear 47. Since the torque carried by the upper face gear 43 and the lower face gear 47 is only half of the torque of the main transmission input pinion 41, these two face gears 43 and 47 may be relatively small and lightweight, compared to the size of a gear required to carry the full torque from the main transmission input pinion 41. The upper face gear 43 and the lower face gear 47 are thus driven simultaneously by the main transmission input pinion 41.

The compliant mount of the main transmission input pinion 41 between the upper face gear 43 and the lower face gear 47 allows the main transmission input pinion 41 to float between the two face gears 43, 47 until forces between the two face gears 43, 47 are equalized. This load-sharing arrangement provides a nearly equal torque split between the two face gears 43, 47. Using a vertically orientated right nacelle 30 (FIG. 1) as a reference, the upper face gear 43 is located above and inboard of the main transmission input pinion 41, and the lower face gear 47 is located below and outboard of the main transmission input pinion 41. This staggered arrangement of the upper face gear 43 and the lower face gear 47 allows each of the two face gears 43, 47 to drive a corresponding helical pinion 45, 50. The first helical pinion 45 and the second helical pinion 50 drive the internal helical ring gear 52, to thereby recombine the torque that was originally split by the upper face gear 43 and the lower face gear 47. A proprotor output 54, which is connected to the internal helical ring gear 52, drives the right proprotor 25 of the tiltrotor aircraft 10.

A substantial reduction in the weight of the drive train within each nacelle of the tiltrotor aircraft is realized with the present invention. Splitting the input torque from the main transmission input pinion 41 into two lightweight gear pathways and then recombining the torque at the output proprotor drive is especially useful in areas of a drive train comprising high torque. The present invention further reduces weight by combining the turbine engine and wing cross shaft drive paths at the conversion access gearset 38.

In the presently preferred embodiment, the contact ratios of all gears are greater than 2 to 1. This includes the contact ratio of the two face gears 43, 47 driven by the main transmission input pinion 41. This contact ratio greater than 2 to 1 means that more than two teeth carry the load at all times during operation. The gears of the present invention having this design are lighter than those of low contact ratio design.

The split torque proprotor transmission of the presently preferred embodiment, which integrates the prior art separate proprotor gearbox and the prior art separate tilt access gearbox into a single gearset, comprises 13 total gears and 19 total bearings. A typical prior art system, on the other hand, may comprise a total of 16 gears and 27 bearings or, alternatively, 18 gears and 29 bearings.

Although the present invention is described in the context of a nacelle transmission, the present invention is applicable to other lower speed, high torque areas of a drive train. In particular, theses lower speed, high torque areas of a drive train can often be reduced in weight by splitting the load into two or more paths, and then recombining this load prior to a driving output stage. The present invention of splitting torque is also especially applicable where reduction in speed is required in a drive train, which usually results in generation of high torque. On the other hand, the present invention may not be especially applicable to high speed, low torque areas of a drive train, since heavy gears are not usually necessary in these areas. For example, in the drive train within a nacelle of a tiltrotor aircraft 10, torque splitting may not be advantageous in the input paths from the turbine engine and the input paths from the wing cross shaft (which are combined for the presently preferred embodiment) where the extra components comprise extra weight.

Although an exemplary embodiment of the invention has been shown and described, many other changes, modifications and substitutions, in addition to those set forth in the above paragraphs, may be made by one having ordinary skill in the art without necessarily departing from the spirit and scope of this invention.

What is claimed is:

1. A proprotor transmission and driveshaft for use in a nacelle of a tiltrotor aircraft, comprising:
    a wing cross shaft having a first bevel gear operatively connected thereto, the wing cross shaft having a shaft axis;
    a proprotor driveshaft adapted to be connected to a proprotor, the proprotor driveshaft having a driveshaft axis;
    a main transmission input shaft having a second bevel gear operatively connected thereto, the main transmission input shaft being operatively coupled to the proprotor driveshaft; and
    a bevel pinion operatively connected to an engine input, the bevel pinion meshing with both the first bevel gear of the wing cross shaft and the second bevel gear of the main transmission input shaft, whereby movement of the second bevel gear relative to the bevel pinion can facilitate positional movement of the driveshaft axis relative to the shaft axis.

2. The proprotor transmission and driveshaft for use in a nacelle of a tiltrotor aircraft according to claim 1, wherein the engine input receives power from a turbine engine.

3. The proprotor transmission and driveshaft for use in a nacelle of a tiltrotor aircraft according to claim 2, further comprising an input pinion connected between the turbine engine and the bevel pinion.

4. The proprotor transmission and driveshaft for use in a nacelle of a tiltrotor aircraft according to claim 3, further comprising:
    at least one idler gear connected between the input pinion and the bevel pinion; and
    a helical gear connected between the at least one idler gear and the bevel pinion.

5. The proprotor transmission and driveshaft for use in a nacelle of a tiltrotor aircraft according to claim 4, further comprising:
    a main transmission input pinion connected to the main transmission input shaft opposite to the second bevel gear, the main transmission input pinion receiving torque from the main transmission input shaft;
    torque splitting means for splitting the torque received from the main transmission input pinion; and
    torque combining means for recombining the split torque supplied from the torque splitting means.

6. The proprotor transmission and driveshaft for use in a nacelle of a tiltrotor aircraft according to claim 5, wherein the torque splitting means comprises:
    an upper face gear operatively connected to the main transmission input pinion; and
    a lower face gear operatively connected to the main transmission input pinion, the upper face gear and the lower face gear together splitting the torque supplied from the main transmission input pinion.

7. The proprotor transmission and driveshaft for use in a nacelle of a tiltrotor aircraft according to claim 6, wherein the torque combining means comprises:
    a first helical pinion connected to the upper face gear;
    a second helical pinion connected to the lower face gear; and
    an internal helical ring gear operatively connected to both the first helical pinion and the second helical pinion.

8. A proprotor drive train path for use in a nacelle of a tiltrotor aircraft, the tiltrotor aircraft having at least one wing and the nacelle being movable relative to the at least one wing, the proprotor drive train path comprising:
    a proprotor gearset disposed within the nacelle and being adapted for receiving power and for driving a proprotor;
    the proprotor gearset comprising:
        an input pinion operatively connected to a turbine engine;
        at least one idler gear operatively connected to the input pinion; and
        a helical gear operatively connected to the at least one idler gear;
    a conversion axis gearset operatively connected to the proprotor gearset, the conversion axis gearset being adapted to facilitate movement of the nacelle relative to the at least one wing; and
    a single housing for covering and protecting both the proprotor gearset and the conversion axis gearset.

9. The proprotor drive train path according to claim 8, wherein the proprotor gearset is adapted for receiving power from the turbine engine, and
    wherein the conversion axis gearset is disposed between the proprotor gearset and the turbine engine.

10. The proprotor drive train path according to claim 8, the conversion axis gearset comprising:
    a bevel pinion connected to the helical gear;
    a first bevel gear meshing with the bevel pinion and being connected to a wing cross shaft; and
    a second bevel gear meshing with the bevel pinion and being connected to a main transmission input shaft.

11. A proprotor drive train path for use in an engine nacelle of a tiltrotor aircraft, the tiltrotor aircraft having at least one wing and the nacelle being movable relative to the at least one wing, the proprotor drive train path comprising:

a proprotor gearset disposed within the engine nacelle and being adapted for receiving power and for driving a proprotor;

an engine input gearset disposed between the proprotor gearset and an engine in the nacelle and adapted for supplying power from the engine to the proprotor gearset; and a conversion axis gearset operatively coupled between the proprotor gearset and the engine input gearset, and the conversion axis gearset being adapted to facilitate movement of the nacelle relative to the at least one wing.

12. A split-torque proprotor transmission for being coupled to a wing cross shaft of a tiltrotor aircraft, the wing cross shaft having a shaft axis, the split-torque proprotor transmission comprising:

an engine input gearset adapted for supplying torque from an engine;

a main transmission input shaft having an input axis and being operatively connected to the engine input gearset, the main transmission input shaft being adapted to receive the torque from the engine; and a conversion axis gearset operatively connected between the engine input gearset and the main transmission input shaft, the conversion axis gearset being adapted to receive torque from the engine and to transmit the received torque to the main transmission input shaft, and the conversion axis gearset further being adapted to facilitate positional movement of the input axis relative to the shaft axis.

13. The split-torque proprotor transmission according to claim 12, wherein the conversion axis gearset is disposed between the engine input gearset and the main transmission input shaft.

14. The split-torque proprotor transmission according to claim 13, further comprising:

a main transmission input pinion connected to the main transmission input shaft;

torque splitting means for splitting the torque received from the main transmission input shaft; and torque combining means for recombining the split torque supplied from the torque splitting means.

15. The split-torque proprotor transmission according to claim 14, wherein the torque splitting means comprises:

an upper face gear operatively connected to the main transmission input pinion; and a lower face gear operatively connected to the main transmission input pinion, the upper face gear and the lower face gear together splitting the torque supplied from the main transmission input shaft.

16. The split-torque proprotor transmission according to claim 15, wherein the torque combining means comprises:

a first helical pinion connected to the upper face gear;

a second helical pinion connected to the lower face gear; and an internal helical ring gear operatively connected to both the first helical pinion and the second helical pinion.

17. The split-torque proprotor transmission according to claim 12, wherein the split-torque proprotor transmission is adapted for use in a nacelle of a tiltrotor aircraft.

18. The split-torque proprotor transmission according to claim 12, wherein the wing cross shaft is operatively connected to the conversion axis gearset, and wherein the conversion axis gearset is adapted to selectively receive torque from either the wing cross shaft or the engine and to transmit the received torque to the main transmission input shaft.

19. The split-torque proprotor transmission according to claim 18, the conversion axis gearset also being adapted to receive torque from the engine and to transmit the received torque to both the wing cross shaft and the main transmission input shaft.

* * * * *